L. O. Franke.
Spinning Top.
N° 94,733.    Patented Sep. 14, 1869.
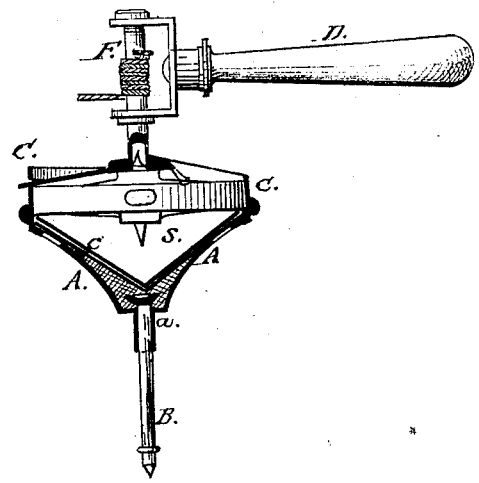
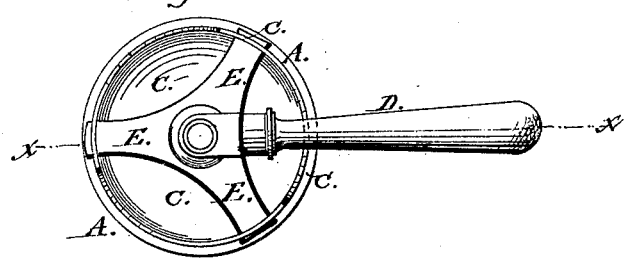
WITNESSES
INVENTOR:
L. O. Franke.

United States Patent Office.

LUDWIG OTTMAR FRANKE, OF BALTIMORE, MARYLAND.

Letters Patent No. 94,733, dated September 14, 1869.

---

IMPROVED SPINNING-TOP.

---

The Schedule referred to in these Letters Patent and making part of the same.

---

*To all whom it may concern:*

Be it known that I, LUDWIG OTTMAR FRANKE, of Baltimore, in the county of Baltimore, and in the State of Maryland, have invented certain new and useful Improvements in Spinning-Tops; and do hereby declare that the following is a full, clear, and exact description thereof, reference being had to the accompanying drawings, and to the letters of reference marked thereon, making a part of this specification, in which—

Figure 1 represents a vertical view of the spinning-top.

Figure 2 is a top view of main portion of top, with disk and wheel enclosed.

The object of this invention is to provide a top that, in addition to the spinning-top itself, the rotary motion shall be in like manner communicated to concave disks and wheels contained within the body of the top.

The main portion A of this top may be made of any suitable metal, circular at its upper part, and gradually narrowing down to a neck, $a$, at its lower part. Through this neck, the spindle or shaft B glides freely, said spindle having a rim at its lower end, to prevent it from leaving the top when in motion.

Upon the rim of the top is a flange, C, with slots, for the insertion of an arm-attachment to the handle D.

The inner surface of the main portion of the top, A, is concave, into which fits two or more concave disks S, or wheels, the upper wheel having a spindle-prolongation on either side, to fit into an aperture in the arm-attachment of the handle, and also into the depression in the concave disk just below it.

Apertures may be made in this upper wheel, when made hollow, to admit the passage of air, and thus increase the humming sound.

On the under surface of the main portion of the top, I make openings, semi-lunar in form, in order that suction of the air may be prevented. Openings of any form or shape would have the same effect.

The upper part of this top consists of a handle, D, a three-arm attachment, E E E, connected to the handle by the shaft F, running up through holes in a bracket, fastened to the end of the handle. Upon this shaft is a hole, for the insertion of the cord.

When this upper portion of the top is detached from the main part, the arm-attachment serves as a winding-wheel, to wind up the cord on the shaft.

By means of the spindle-prolongations on the wheel, and centre depressions in the disks, the chain of motion is kept unbroken from the spindle upward to the shaft on the handle.

Having described the main features of this top, I will now show how it is operated.

The cord having been wound on the shaft connected with the arm-attachment of the handle or upper portion of the top, and said arms being inserted in the slots, the top is operated by holding on to the handle with one hand and pulling the cord briskly with the other. The arms are thus disengaged from the slots, the spindle B is permitted then to slide upward, throwing out the concave disks and wheel, imparting to each one the top or rotary motion, at the same time the top itself is in motion.

Having thus described my invention,

What I claim as new, and desire to secure by Letters Patent, is—

1. The sliding spindle B, in combination with the interior disks or wheels S, as and for the purpose described.

2. The arrangement of spindle B, disks and wheels S, cup-shaped top, A, and spinning-device E F D, substantially as and for the purpose described.

In testimony that I claim the foregoing, I have hereunto set my hand, this 24th day of May, 1869.

LUDWIG OTTMAR FRANKE.

Witnesses:
    JOS. RAIBER,
    F. SCHWARZ.